(12) United States Patent
Suzuki

(10) Patent No.: US 8,184,291 B2
(45) Date of Patent: May 22, 2012

(54) METHOD FOR DETECTING EDGE ON TRANSPARENT SUBSTRATE, APPARATUS FOR DETECTING EDGE ON TRANSPARENT SUBSTRATE, AND PROCESSING APPARATUS

(75) Inventor: Masahiko Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 323 days.

(21) Appl. No.: 12/597,016

(22) PCT Filed: Feb. 12, 2008

(86) PCT No.: PCT/JP2008/000204
§ 371 (c)(1),
(2), (4) Date: Oct. 22, 2009

(87) PCT Pub. No.: WO2009/011079
PCT Pub. Date: Jan. 22, 2009

(65) Prior Publication Data
US 2010/0091281 A1    Apr. 15, 2010

(30) Foreign Application Priority Data
Jul. 17, 2007    (JP) ................................ 2007-186081

(51) Int. Cl.
*G01J 4/00* (2006.01)
(52) U.S. Cl. ........................................ 356/364; 356/366
(58) Field of Classification Search .......... 356/364–369; 250/225
See application file for complete search history.

(56) References Cited

U.S. PATENT DOCUMENTS

| | | |
|---|---|---|
| 5,107,131 A | 4/1992 | Okada et al. |
| 6,700,603 B1 | 3/2004 | Okuchi et al. |

FOREIGN PATENT DOCUMENTS

| | | |
|---|---|---|
| CN | 1273639 A | 11/2000 |
| JP | 49-90150 U | 8/1974 |
| JP | 60-129602 A | 7/1985 |
| JP | 05-319680 A | 12/1993 |
| JP | 07-300559 A | 11/1995 |
| JP | 2004-346199 A | 12/2004 |
| WO | 00/47947 A1 | 8/2008 |

OTHER PUBLICATIONS

Official Communication issued in International Patent Application No. PCT/JP2008/000204, mailed on Mar. 25, 2008.

*Primary Examiner* — Layla Lauchman
(74) *Attorney, Agent, or Firm* — Keating & Bennett, LLP

(57) ABSTRACT

An apparatus for detecting an edge of a transparent substrate includes a light source provided on a rear side of the edge of the transparent substrate, a first polarizer provided between the transparent substrate and the light source and arranged to convert light from the light source to linearly polarized light, a light receiving unit provided on a front side of the edge of the transparent substrate, and a second polarizer provided between the transparent substrate and the light receiving unit, and having a polarization axis that is perpendicular or substantially perpendicular to a polarization axis of the first polarizer. The light receiving unit is configured to observe, through the second polarizer, the linearly polarized light that is converted by the first polarizer and is transmitted through the edge of the transparent substrate, the linearly polarized light that is converted by the first polarizer and passes outside the transparent substrate, and emitted light that is converted by the first polarizer, and is propagated through inside of the transparent substrate and emitted from a side surface of the edge of the transparent substrate.

8 Claims, 8 Drawing Sheets

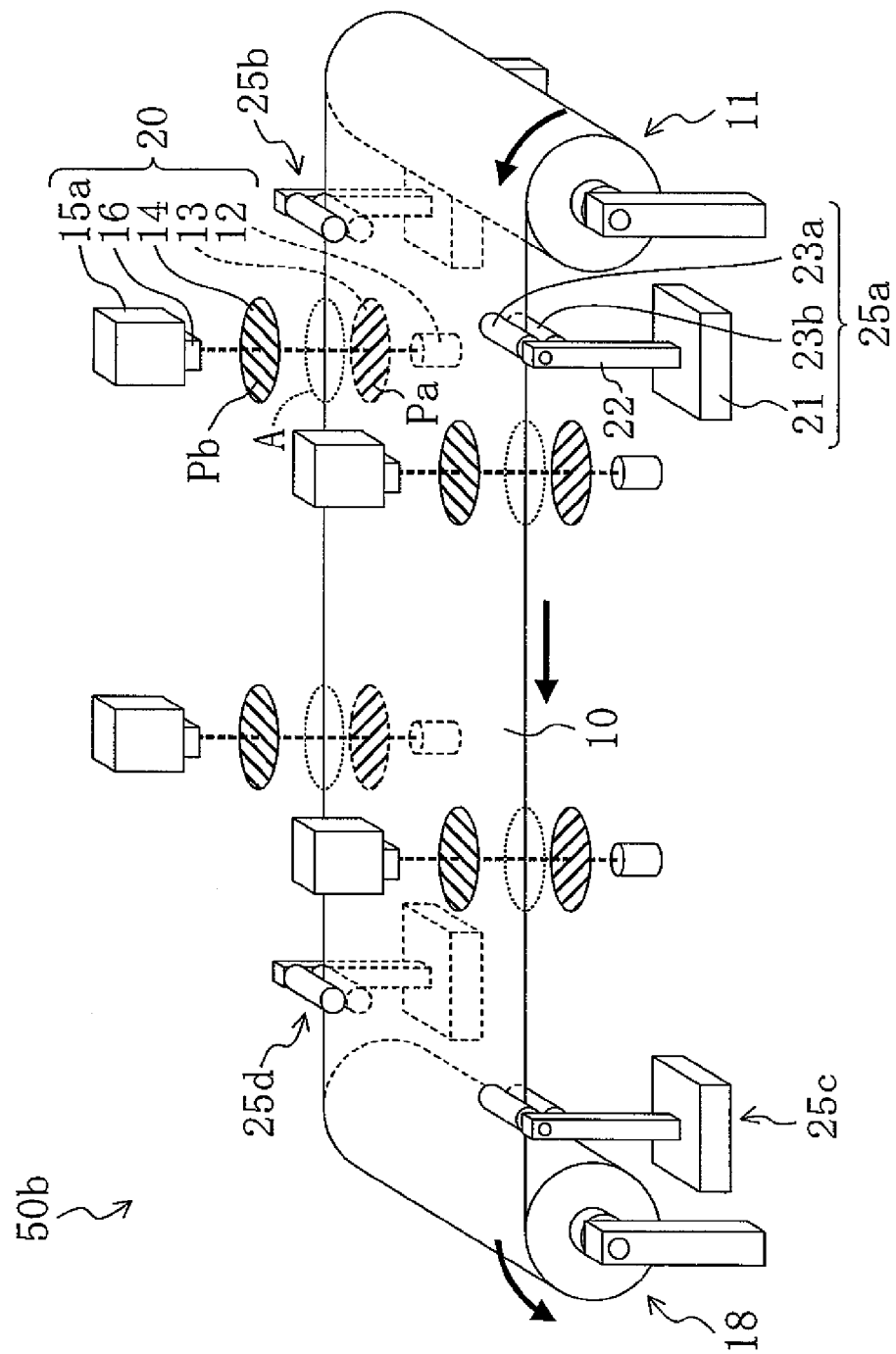

METHOD FOR DETECTING EDGE ON TRANSPARENT SUBSTRATE, APPARATUS FOR DETECTING EDGE ON TRANSPARENT SUBSTRATE, AND PROCESSING APPARATUS

BACKGROUND OF THE INVENTION

1. Field of the Invention

The present invention generally relates to methods and apparatuses for detecting an edge of a transparent substrate, and processing apparatuses. More particularly, the present invention relates to techniques for detecting an edge of a transparent substrate having optical isotropy, which are used in liquid crystal display (LCD) panels and the like.

2. Description of the Related Art

In manufacturing of LCD panels, it is important to accurately detect an edge of a substrate since various thin films are laminated at predetermined positions on a transparent substrate.

For example, Japanese Published Patent Application No. H03-6406 discloses a method for detecting an edge of a transparent film, in which light from a light source is converted to linearly polarized light by a polarizer, a part of the linearly polarized light is transmitted through a transparent film, the light transmitted through the transparent film and another part of the linearly polarized light are directed to an analyzer for transmitting only linearly polarized light that is perpendicular to the linearly polarized light therethrough, and the edge of the transparent film is detected from the light transmitted through the analyzer.

Incidentally, in LCD panels, flexible display panels using flexible film substrates have been developed instead of conventionally used glass substrates. Film substrates for use in LCD panels are required to have very high optical isotropy in order to accurately transmit linearly polarized light, transmitted through the film substrate, to a liquid crystal layer.

For example, Japanese Published Patent Application No. H07-300559 discloses a solution composition having an aromatic polyethersulfone dissolved in a solvent containing 1,3-dioxolane, and a method for manufacturing a film, in which an aromatic polyethersulfone film having an excellent surface property and excellent optical isotropy is obtained by a casting method by using the solution composition.

Moreover, Japanese Published Patent Application No. 2004-346199 discloses a method for manufacturing an optical film, in which a film is taken up at a take-up speed of a predetermined range when the film is manufactured by extruding a maleimide-olefin copolymer and an acrylonitrile-styrene copolymer by a T-die melt extrusion method, and passing the extruded film on one or a plurality of cooling rolls. Japanese Published Patent Application No. 2004-346199 describes that, since the optical film obtained has excellent optical isotropy, the optical film can be preferably used as a transparent electrode film, a protective film for polarizing films, a retardation film, and the like, which are used in LCD devices and the like.

Incidentally, the edge detection method disclosed in Japanese Published Patent Application No. H03-6406 is a method for detecting an edge of a transparent film by using optical activity (optical rotatory power) of the transparent film. Thus, this edge detection method has a problem that no substrate edge is detected in optically inactive film substrates, for example, film substrates having optical isotropy for use in LCD panels, such as those disclosed in Japanese Published Patent Application No. H07-300559 and Japanese Published Patent Application No. 2004-346199.

SUMMARY OF THE INVENTION

In view of the above problems, preferred embodiments of the present invention provide a method and apparatus for accurately detecting an edge of a transparent substrate having optical isotropy.

According to a preferred embodiment of the present invention, linearly polarized light from a light source, converted by a first polarizer, is directed to an edge of a transparent substrate, and the linearly polarized light that is transmitted through the edge of the transparent substrate, the linearly polarized light that passes outside the transparent substrate, and emitted light that is propagated through inside of the transparent substrate and emitted from a side surface of the edge of the transparent substrate, are observed through a second polarizer having a polarization axis that is perpendicular or substantially perpendicular to a polarization axis of the first polarizer.

More specifically, a method for detecting an edge of a transparent substrate according to a preferred embodiment of the present invention is a method for detecting an edge of a transparent substrate having optical isotropy, which includes: directing linearly polarized light from a light source, converted by a first polarizer, to an edge of a rear surface of the transparent substrate; and observing the linearly polarized light that is transmitted through the edge of the transparent substrate, the linearly polarized light that passes outside the transparent substrate, and emitted light that is propagated through inside of the transparent substrate and emitted from a side surface of the edge of the transparent substrate, from a front side of the transparent substrate through a second polarizer having a polarization axis that is perpendicular or substantially perpendicular to a polarization axis of the first polarizer.

According to the above method, since the transparent substrate has optical isotropy, the linearly polarized light converted by the first polarizer does not change in terms of the vibration direction of its light waves even after being transmitted through the transparent substrate. Thus, the linearly polarized light that is transmitted through the edge of the transparent substrate, and the linearly polarized light that passes outside the transparent substrate are blocked by the second polarizer having a polarization axis that is perpendicular or substantially perpendicular to a polarization axis of the first polarizer, and thus, are detected as dark portions. Moreover, the emitted light, which is propagated through the inside of the transparent substrate and emitted from the side surface of the edge of the transparent substrate, has no linear polarization property any more, and thus, is not blocked by the second polarizer, and is detected as a bright portion. Thus, since the bright portion corresponding to the edge of the transparent substrate is detected between the dark portion resulting from the linearly polarized light that is transmitted through the edge of the transparent substrate, and the dark portion resulting from the linearly polarized light that passes outside the transparent substrate, the edge of the transparent substrate having optical isotropy is accurately detected.

Moreover, an apparatus for detecting an edge of a transparent substrate according to another preferred embodiment of the present invention is an apparatus for detecting an edge of a transparent substrate having optical isotropy, which includes: a light source provided on a rear side of the edge of the transparent substrate; a first polarizer provided between the transparent substrate and the light source, and arranged to convert light from the light source to linearly polarized light; a light receiving unit provided on a front side of the edge of the transparent substrate; and a second polarizer provided between the transparent substrate and the light receiving unit, and having a polarization axis that is perpendicular or substantially perpendicular to a polarization axis of the first polarizer. The light receiving unit is configured to observe, through the second polarizer, the linearly polarized light that is converted by the first polarizer and is transmitted through the edge of the transparent substrate, the linearly polarized light that is converted by the first polarizer and passes outside the transparent substrate, and emitted light that is converted by the first polarizer, and is propagated through inside of the transparent substrate and emitted from a side surface of the edge of the transparent substrate.

According to the above structure, since the transparent substrate has optical isotropy, the linearly polarized light from the light source, converted by the first polarizer, does not change in terms of the vibration direction of its light waves even after being transmitted through the transparent substrate. Thus, the linearly polarized light that is transmitted through the edge of the transparent substrate, and the linearly polarized light that passes outside the transparent substrate are blocked by the second polarizer having a polarization axis that is perpendicular or substantially perpendicular to a polarization axis of the first polarizer, and thus, are detected as dark portions in the light receiving unit. Moreover, the emitted light, which is propagated through the inside of the transparent substrate and emitted from the side surface of the edge of the transparent substrate, has no linear polarization property any more, and thus, is not blocked by the second polarizer, and is detected as a bright portion in the light receiving unit. Thus, in the light receiving unit, the bright portion corresponding to the edge of the transparent substrate is detected between the dark portion resulting from the linearly polarized light that is transmitted through the edge of the transparent substrate, and the dark portion resulting from the linearly polarized light that passes outside the transparent substrate, whereby the edge of the transparent substrate having optical isotropy is accurately detected.

The apparatus may further include a microscope provided between the light receiving unit and the second polarizer, arranged to magnify and observe the edge of the transparent substrate.

According to the above structure, since the edge of the transparent substrate is magnified and observed by the microscope, the edge of the transparent substrate having optical isotropy is detected more accurately.

The light receiving unit may be an at least one-dimensional light receiving element, or a camera arranged to detect a two-dimensional image, for example.

According to the above structure, the light receiving unit preferably includes, for example, a one-dimensional (two-dimensional) image sensor, a CCD (charge-coupled device) camera, or the like, whereby the functions and effects of preferred embodiments of the present invention are specifically obtained.

Moreover, a processing apparatus according to a preferred embodiment of the present invention is a processing apparatus for transferring and processing a transparent substrate having optical isotropy by a roll-to-roll method, which includes: a light source provided on a rear side of an edge of the transparent substrate; a first polarizer provided between the transparent substrate and the light source, and arranged to convert light from the light source to linearly polarized light; a light receiving unit provided on a front side of the edge of the transparent substrate; and a second polarizer provided between the transparent substrate and the light receiving unit, and having a polarization axis that is perpendicular or substantially perpendicular to a polarization axis of the first polarizer. The light receiving unit is configured to detect the edge of the transparent substrate being transferred, by observing, through the second polarizer, the linearly polarized light that is converted by the first polarizer and is transmitted through the edge of the transparent substrate, the linearly polarized light that is converted by the first polarizer and passes outside the transparent substrate, and emitted light that is converted by the first polarizer, and is propagated through inside of the transparent substrate and emitted from a side surface of the edge of the transparent substrate.

According to the above structure, since the transparent substrate has optical isotropy, the linearly polarized light from the light source, converted by the first polarizer, does not change in terms of the vibration direction of its light waves even after being transmitted through the transparent substrate. Thus, the linearly polarized light that is transmitted through the edge of the transparent substrate, and the linearly polarized light that passes outside the transparent substrate are blocked by the second polarizer having a polarization axis that is perpendicular or substantially perpendicular to a polarization axis of the first polarizer, and thus, are detected as dark portions in the light receiving unit. Moreover, the emitted light, which is propagated through the inside of the transparent substrate and emitted from the side surface of the edge of the transparent substrate, has no linear polarization property any more, and thus, is not blocked by the second polarizer, and is detected as a bright portion in the light receiving unit. Thus, in the light receiving unit, the bright portion corresponding to the edge of the transparent substrate is detected between the dark portion resulting from the linearly polarized light that is transmitted through the edge of the transparent substrate, and the dark portion resulting from the linearly polarized light that passes outside the transparent substrate, whereby the edge of the transparent substrate having optical isotropy is accurately detected. Moreover, since the light receiving unit accurately detects the position of the transparent substrate that is transferred in the processing apparatus, processes such as, for example, exposure, film formation, cleaning, etching, and inspection are accurately performed on the transparent substrate.

The processing apparatus may further include an exposure unit arranged to perform an exposure process on the transparent substrate whose edge has been detected by the light receiving unit.

According to the above structure, since the processing apparatus includes the exposure unit, the exposure process is accurately performed on the transparent substrate that is transferred in the processing apparatus.

The processing apparatus may further include a film formation unit arranged to form a film on the transparent substrate whose edge has been detected by the light receiving unit.

According to the above structure, since the processing apparatus includes the film formation unit, a film is accurately formed on the transparent substrate that is transferred in the processing apparatus.

The processing apparatus may further include a meandering correction unit arranged to correct meandering of the transparent substrate whose edge has been detected by the light receiving unit.

According to the above structure, since the processing apparatus includes the meandering correction unit, the meandering correction unit returns the edge of the transparent substrate to a predetermined position to correct meandering of the transparent substrate, even if the transparent substrate, which is transferred in the processing apparatus, meanders with its edge being displaced from the predetermined position.

According to various preferred embodiments of the present invention, linearly polarized light from a light source, converted by a first polarizer, is directed to an edge of a transparent substrate, and the linearly polarized light that is transmitted through the edge of the transparent substrate, the linearly polarized light that passes outside the transparent substrate, and emitted light that is propagated through the inside of the transparent substrate and emitted from a side surface of the edge of the transparent substrate, are observed through a second polarizer having a polarization axis that is perpendicular or substantially perpendicular to a polarization axis of the first polarizer. Thus, the edge of the transparent substrate having optical isotropy can be accurately detected.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 2 is a schematic view showing a field of view image I in a CCD camera 15a of the processing apparatus 50a.

FIG. 3 is a top view showing a normal state of a film substrate 10 that is transferred by the processing apparatus 50a.

FIG. 4 is a top view showing a meandering state of the film substrate 10 that is transferred by the processing apparatus 50a.

FIG. 8 is a perspective view of a processing apparatus 50b according to a second preferred embodiment of the present invention.

DETAILED DESCRIPTION OF THE PREFERRED EMBODIMENTS

Preferred embodiments of the present invention will be described below in detail with reference to the accompanying drawings. Note that the present invention is not limited to the following preferred embodiments.

First Preferred Embodiment

FIGS. 1 through 7 show a first preferred embodiment of a method and an apparatus for detecting an edge of a transparent substrate, and a processing apparatus, according to the present invention.

Figure 1:
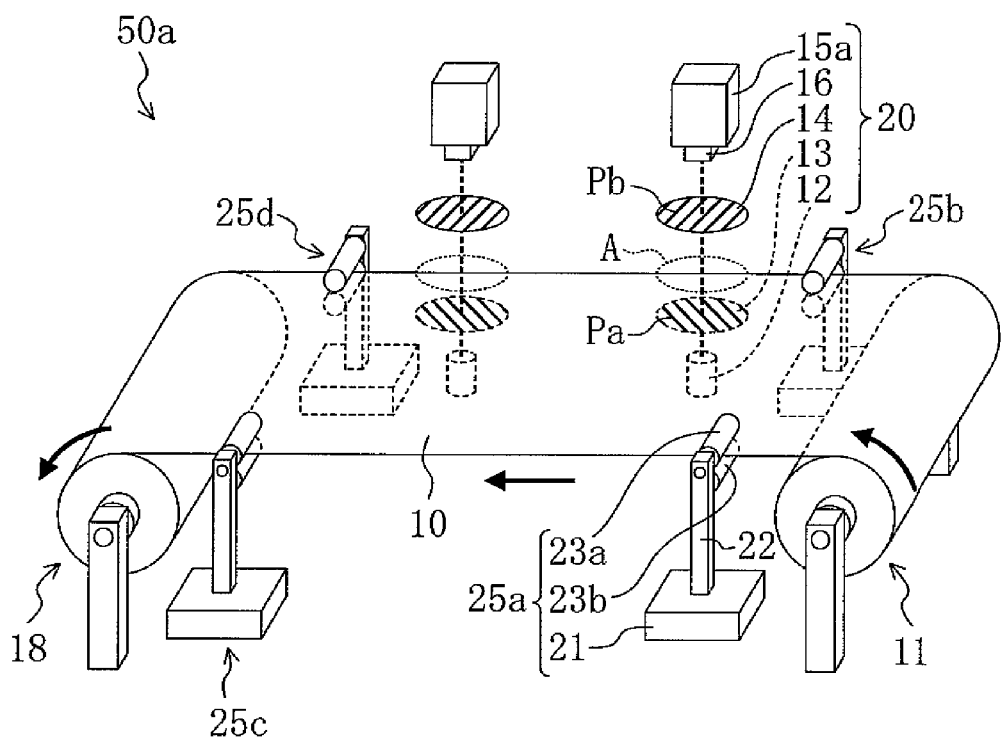
FIG. 1 is a perspective view of a processing apparatus 50a according to a first preferred embodiment of the present invention.

FIG. 1 is a perspective view of a processing apparatus 50a of the present preferred embodiment.

As shown in FIG. 1, the processing apparatus 50a is configured so that a film substrate 10, wound off from a wind-off roll 11, is processed while being transferred from right to left, and then, is wound up onto a wind-up roll 18.

As shown in FIG. 1, a pair of meandering correction units 25a and 25b, which are configured to nip both ends of the film substrate 10 after the film substrate 10 is wound off, are disposed on the left side of the wind-off roll 11.

As shown in FIG. 1, a pair of meandering correction units 25c and 25d, which are configured to nip both ends of the film substrate 10 before the film substrate 10 is wound up, are disposed on the right side of the wind-up roll 18.

As shown in FIG. 1, each meandering correction unit 25a through 25d includes a base portion 21 arranged to movable along the width direction of the film substrate 10, a support portion 22 arranged so as to stand vertically on the base portion 21, and a pair of nip rolls 23a and 23b rotatably arranged on the upper portion of the support portion 22 so as to protrude laterally.

As shown in FIG. 1, the meandering correction units 25a and 25b (25c and 25d) are configured so as to correct meandering of the film substrate 10 by nipping both ends of the film substrate 10 between a peripheral wall of the upper nip roll 23a and a peripheral wall of the lower nip roll 23b, and translating along the width direction of the film substrate 10 as appropriate while applying a fixed tension so that the film substrate 10 does not sag in the width direction.

As shown in FIG. 1, edge detection apparatuses 20 are provided on the left side of the meandering correction unit 25b and on the right side of the meandering correction unit 25d, respectively, where each edge detection apparatus 20 includes a light source 12 provided on the rear side of the edge of the film substrate 10, a first polarization filter 13 provided as a first polarizer between the film substrate 10 and the light source 12, a CCD camera 15a provided as a light receiving unit on the front side of the edge of the film substrate 10, a second polarization filter 14 provided as a second polarizer between the film substrate 10 and the CCD camera 15a, and an microscope 16 with a magnification of about 10× provided on the second polarization filter 14 side of the CCD camera 15a. Note that a polarization axis Pb of the second polarization filter 14 is substantially perpendicular to a polarization axis Pa of the first polarization filter 13.

The film substrate 10 is a transparent substrate having optical isotropy, which is manufactured with a width of about 500 mm, a length of about 60 m, and a thickness of about 100 μm by, for example, the manufacturing methods disclosed in Japanese Published Patent Application No. H07-300559 and Japanese Published Patent Application No. 2004-346199.

Figure 2:
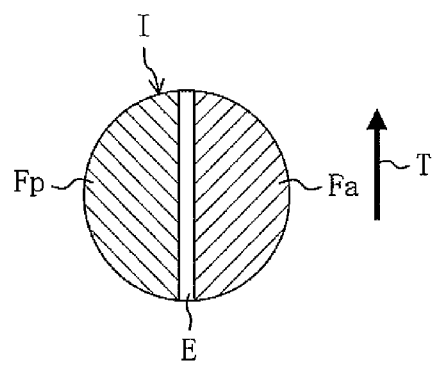

Next, a method for detecting an edge of the film substrate 10 by the processing apparatus 50a of the above structure will be described with reference to FIGS. 1 and 2. FIG. 2 is a schematic view showing a field of view image I in the CCD camera 15a. The field of view image I of FIG. 2 herein has, for example, a diameter of about 5 mm. Note that arrow T in FIG. 2 indicates the direction in which the film substrate 10 is transferred (hereinafter referred to as the "substrate transfer direction").

Light from the light source 12 is converted to linearly polarized light by the first polarization filter 13, and the linearly polarized light converted is directed to the edge of the rear surface of the film substrate 10 (see an irradiation region A in FIG. 1). The irradiation region A of the film substrate 10 is captured by the CCD camera 15a through the second polarization filter 14. At this time, since the film substrate 10 has optical isotropy, the linearly polarized light from the light source 12, converted by the first polarization filter 13, does not change in terms of the vibration direction of its light waves even after being transmitted through the film substrate 10. Thus, the linearly polarized light that is transmitted through the edge of the film substrate 10, and the linearly polarized light that passes outside the film substrate 10 are blocked by the second polarization filter 14, and thus, are detected as dark portions in the CCD camera 15a. Moreover, emitted light, which is propagated through the inside of the film substrate 10 and emitted from the side surface of the edge of the film substrate 10, has no linear polarization property any more, and thus, is not blocked by the second polarization filter 14, and is detected as a linear bright portion in the CCD camera 15a. Thus, in the CCD camera 15a, as shown in the field of view image I of FIG. 2, a linear bright portion E corresponding to the edge of the film substrate 10 is detected between the dark portion resulting from the linearly polarized light that is transmitted through the edge of the film substrate 10 (see a portion Fp where the film substrate 10 is present (hereinafter referred to as the "film present portion Fp")), and the dark portion resulting from the linearly polarized light that passes outside the film substrate 10 (see a portion Fa where no film substrate 10 is present (hereinafter referred to as the "film absent portion Fa")).

Figure 3:
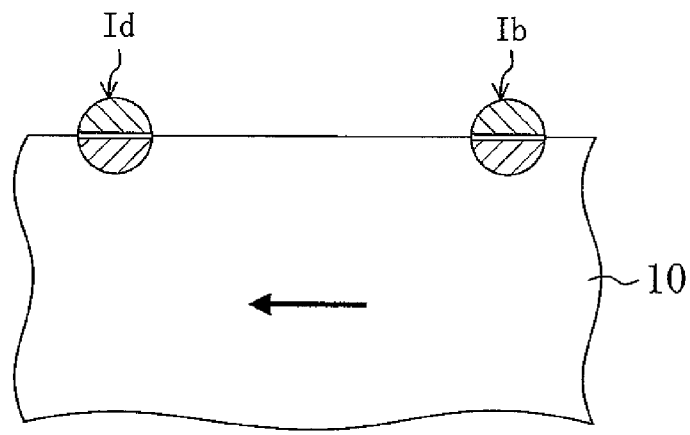
Figure 4:
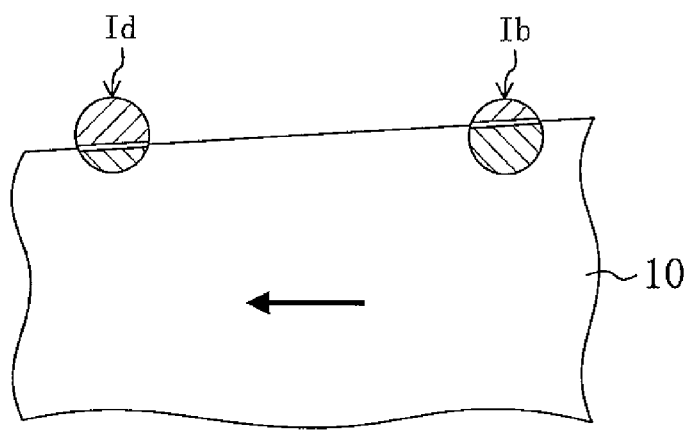

FIG. 3 is a top view showing a normal state of the film substrate 10 that is transferred by the processing apparatus 50a, and FIG. 4 is a top view showing a meandering state thereof.

In the case where the film substrate 10 is transferred without meandering, as shown in FIG. 3, the linear bright portion E corresponding to the edge of the film substrate 10 is located in the middle in the field of view images Id and Ib.

Each edge detection apparatus 20 is disposed at a fixed position in the processing apparatus 50a. Thus, in the case where the film substrate 10 meanders while being transferred, as shown in FIG. 4, the linear bright portion E is shifted downward (to the left side as viewed toward the substrate transfer direction) and upward (to the right side as viewed toward the substrate transfer direction) in the field of view images Id and Ib, respectively. In this case, the meandering correction units 25a and 25b are moved to the left as viewed toward the substrate transfer direction, and the meandering correction units 25c and 25d are moved to the right as viewed toward the substrate transfer direction, to correct meandering of the film substrate 10.

In this manner, the edge of the film substrate 10 can be detected, and meandering of the film substrate 10 can be corrected.

Figure 5:
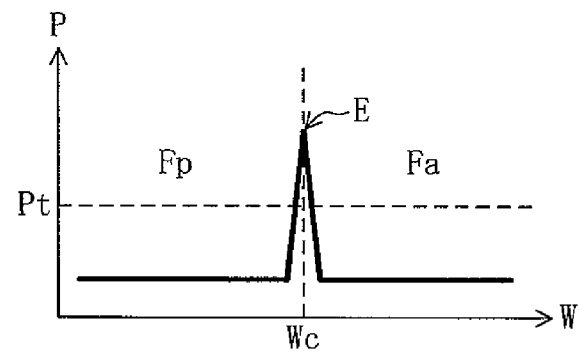
FIG. 5 is a graph showing an example of a sensor output of a one-dimensional image sensor.

Moreover, in the case of using a one-dimensional image sensor instead of the CCD camera 15a, a sensor output as shown in FIG. 5 is obtained by arranging a plurality of light receiving elements in line along the width direction of the film substrate 10.

In FIG. 5, the abscissa indicates a position W in the width direction of the film substrate 10, and the ordinate indicates a sensor output P, where Wc on the abscissa is a middle position of the sensor (the plurality of light receiving elements arranged in line), and Pt on the ordinate is a threshold value for determining as an edge of the film substrate 10. Like the CCD camera 15a, linearly polarized light that is transmitted through the edge of the film substrate 10, and linearly polarized light that passes outside the film substrate 10 are blocked by the second polarization filter 14, and thus, are detected as dark portions (a film present portion Fp and a film absent portion Fa) at a relatively low output by the one-dimensional image sensor. Moreover, emitted light, which is propagated through the inside of the film substrate 10 and emitted from the side surface of the edge of the film substrate 10, has no linear polarization property any more, and thus, is not blocked by the second polarization filter 14, and is detected as a bright portion E at a relatively high output by the one-dimensional image sensor.

Figure 6:
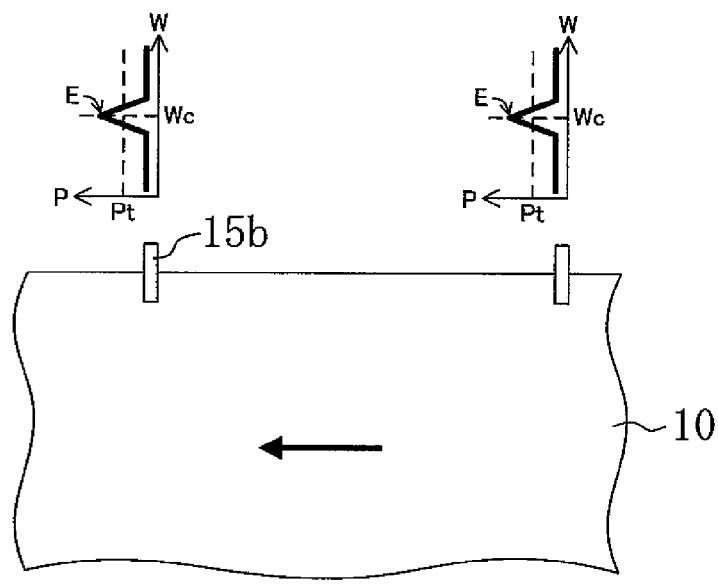
FIG. 6 is a top view showing a normal state of the film substrate 10 that is transferred by a processing apparatus including one-dimensional image sensors 15b.
Figure 7:
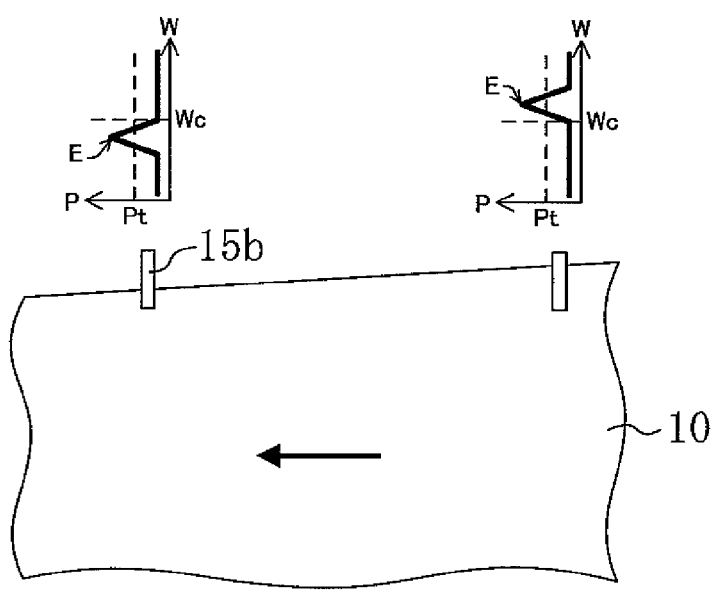
FIG. 7 is a top view showing a meandering state of the film substrate 10 that is transferred by the processing apparatus including the one-dimensional image sensors 15b.

FIG. 6 is a top view showing a normal state of the film substrate 10 that is transferred by a processing apparatus including one-dimensional image sensors 15b, and FIG. 7 is a top view showing a meandering state thereof.

In the case where the film substrate 10 is transferred without meandering, as shown in FIG. 6, the bright portion E, which indicates the edge of the film substrate 10, corresponds to the middle position Wc of the sensor.

Each edge detection apparatus 20 (each one-dimensional image sensor 15b) is disposed at a fixed position in the processing apparatus 50a. Thus, in the case where the film substrate 10 meanders while being transferred, as shown in FIG. 7, the bright portion E, which indicates the edge of the film substrate 10, is shifted away from the middle position Wc of the sensor.

As described above, in the edge detection method and the edge detection apparatus 20 for the film substrate 10, and the processing apparatus (50a) according to the present preferred embodiment, since the film substrate 10 has optical isotropy, linearly polarized light from the light source 12, converted by the first polarization filter 13, does not change in terms of the vibration direction of its light waves even after being transmitted through the film substrate 10. Thus, the linearly polarized light that is transmitted through the edge of the film substrate 10, and the linearly polarized light that passes outside the film substrate 10 are blocked by the second polarization filter 14 having the polarization axis Pb perpendicular or substantially perpendicular to the polarization axis Pa of the first polarization filter 13, and thus, are detected as dark portions in the CCD camera 15a or the one-dimensional image sensor 15b. Moreover, emitted light, which is propagated through the inside of the film substrate 10 and emitted from the side surface of the edge of the film substrate 10, has no linear polarization property any more, and thus, is not blocked by the second polarization filter 14, and is detected as a bright portion in the CCD camera 15a or the one-dimensional image sensor 15b. Thus, in the CCD camera 15a or the one-dimensional image sensor 15b, since a bright portion E corresponding to the edge of the film substrate 10 is detected between the dark portion resulting from the linearly polarized light that is transmitted through the edge of the film substrate 10 (the film present portion Fp), and the dark portion resulting from the linearly polarized light that passes outside the film substrate 10 (the film absent portion Fa), the edge of the film substrate 10 having optical isotropy can be accurately detected.

Moreover, according to the edge detection apparatus 20 of the present preferred embodiment, since the microscope 16 for magnifying and observing the edge of the film substrate 10 is disposed between the CCD camera 15a or the one-dimensional image sensor 15b, provided as a light receiving unit, and the second polarization filter 14, the edge of the film substrate 10 is magnified and observed by the microscope 16, whereby the edge of the film substrate 10 can be more accurately detected.

Second Preferred Embodiment

FIG. 8 is a perspective view of a processing apparatus 50b of the present preferred embodiment. Note that, in the following preferred embodiments, the same elements as those of FIGS. 1 through 7 are denoted with the same reference characters, and detailed description thereof will be omitted.

In the processing apparatus 50a of the first preferred embodiment, the edge detection apparatuses 20 are preferably disposed at one end of the film substrate 10 to be transferred. In the processing apparatus 50b of the present embodiment, however, the edge detection apparatuses 20 are preferably provided for each meandering correction unit 25a through 25d, and are disposed at both ends of the film substrate 10.

Figure 9A:
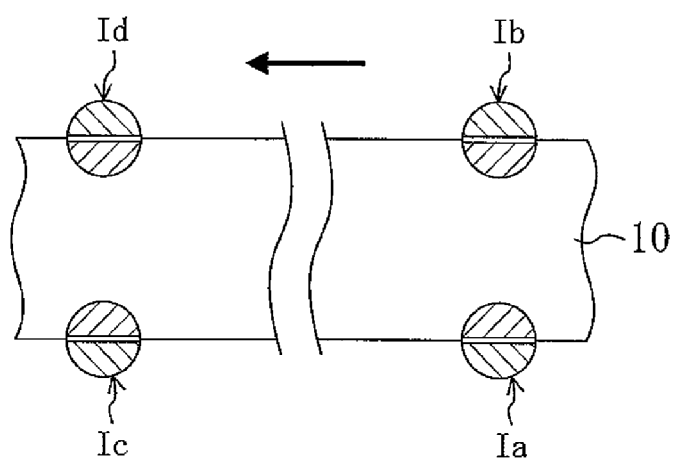
FIGS. 9A and 9B are top views showing a normal state of the film substrate 10 that is transferred by the processing apparatus 50b.
Figure 9B:
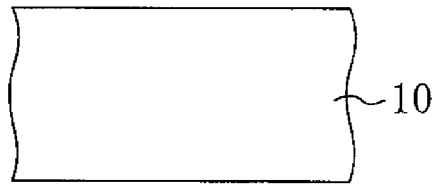
Figure 10A:
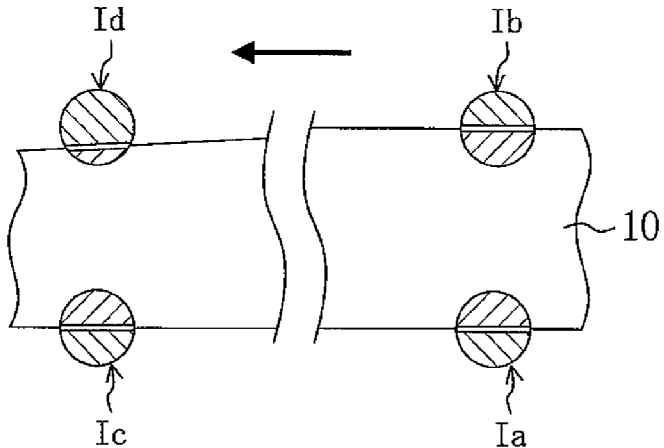
FIGS. 10A and 10B are top views showing a state where the film substrate 10 that is transferred by the processing apparatus 50b is sagging.
Figure 10B:
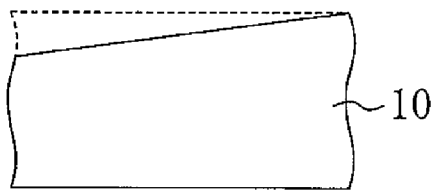
Figure 11A:
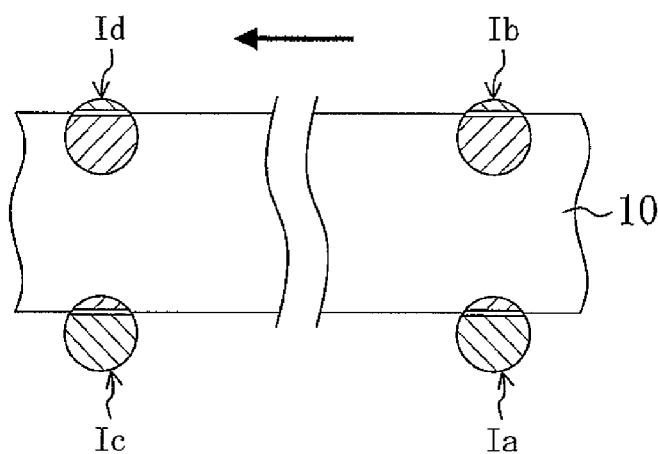
FIGS. 11A and 11B are top views showing a state where the film substrate 10, which is transferred by the processing apparatus 50b, is displaced in the width direction.
Figure 11B:
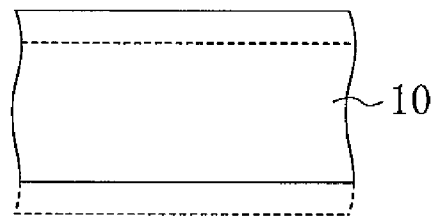
Figure 12A:
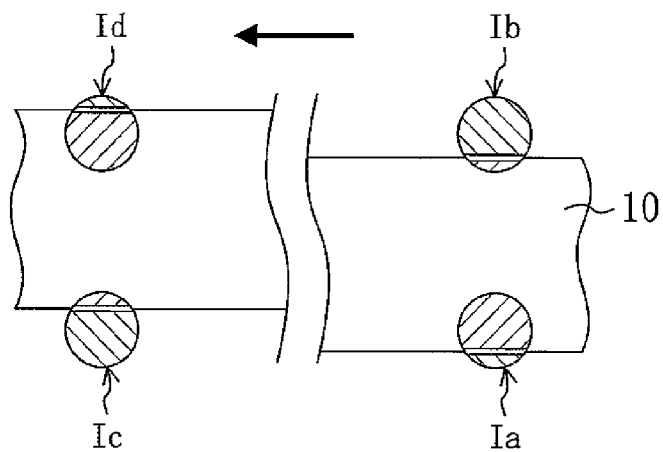
FIGS. 12A and 12B are top views showing a state where the film substrate 10, which is transferred by the processing apparatus 50b, is displaced obliquely along the transfer direction.
Figure 12B:
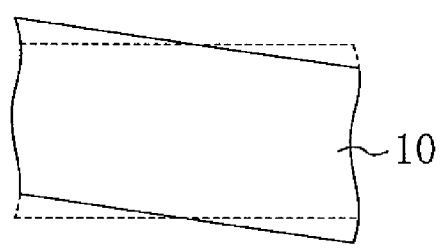

FIGS. 9A and 9B are top views showing a normal state of the film substrate 10 that is transferred by the processing apparatus 50b, FIGS. 10A and 10B are top views showing a state where the film substrate 10 is sagging. Moreover, FIGS. 11A and 11B are top views showing a state where the film substrate 10, which is transferred by the processing apparatus 50b, is displaced in the width direction, and FIGS. 12A and 12B are top views showing a state where the film substrate 10 is displaced obliquely along the substrate transfer direction. Note that, in FIGS. 9A through 12B, FIGS. 9B, 10B, 11B and 12B are top views schematically showing the state of the film substrate 10 being transferred, and dashed line in the figures indicates the outline of the film substrate 10 at a normal position.

In the case where the film substrate 10 is transferred without meandering, as shown in FIGS. 9A and 9B, a linear bright portion E corresponding to the edge of the film substrate 10 is located in the middle in each field of view image Ia through Id.

Each edge detection apparatus 20 is disposed at a fixed position in the processing apparatus 50b. Thus, in the case where the film substrate 10 is sagging while being transferred, as shown in FIGS. 10A and 10B, the linear bright portion E is shifted downward (to the left side as viewed toward the substrate transfer direction) in the field of view image Id.

Moreover, in the case where the film substrate 10 is displaced in the width direction while being transferred, as shown in FIGS. 11A and 11B, the linear bright portion E corresponding to the edge of the film substrate 10 is shifted upward in each field of view image Ia through Id.

Moreover, in the case where the film substrate 10 is displaced obliquely along the width direction while being transferred, as shown in FIG. 12, the linear bright portion E corresponding to the edge of the film substrate 10 is shifted upward in the field of view images Ic and Id, and the linear bright portion E corresponding to the edge of the film substrate 10 is shifted downward in the field of view images Ia and Ib.

According to the processing apparatus 50b of the present preferred embodiment, the edges of the film substrate 10 having optical isotropy can be accurately detected as in the case of the processing apparatus 50a of the first preferred embodiment, and also, meandering of the film substrate 10 can be detected in more detail.

Third Preferred Embodiment

Figure 13:
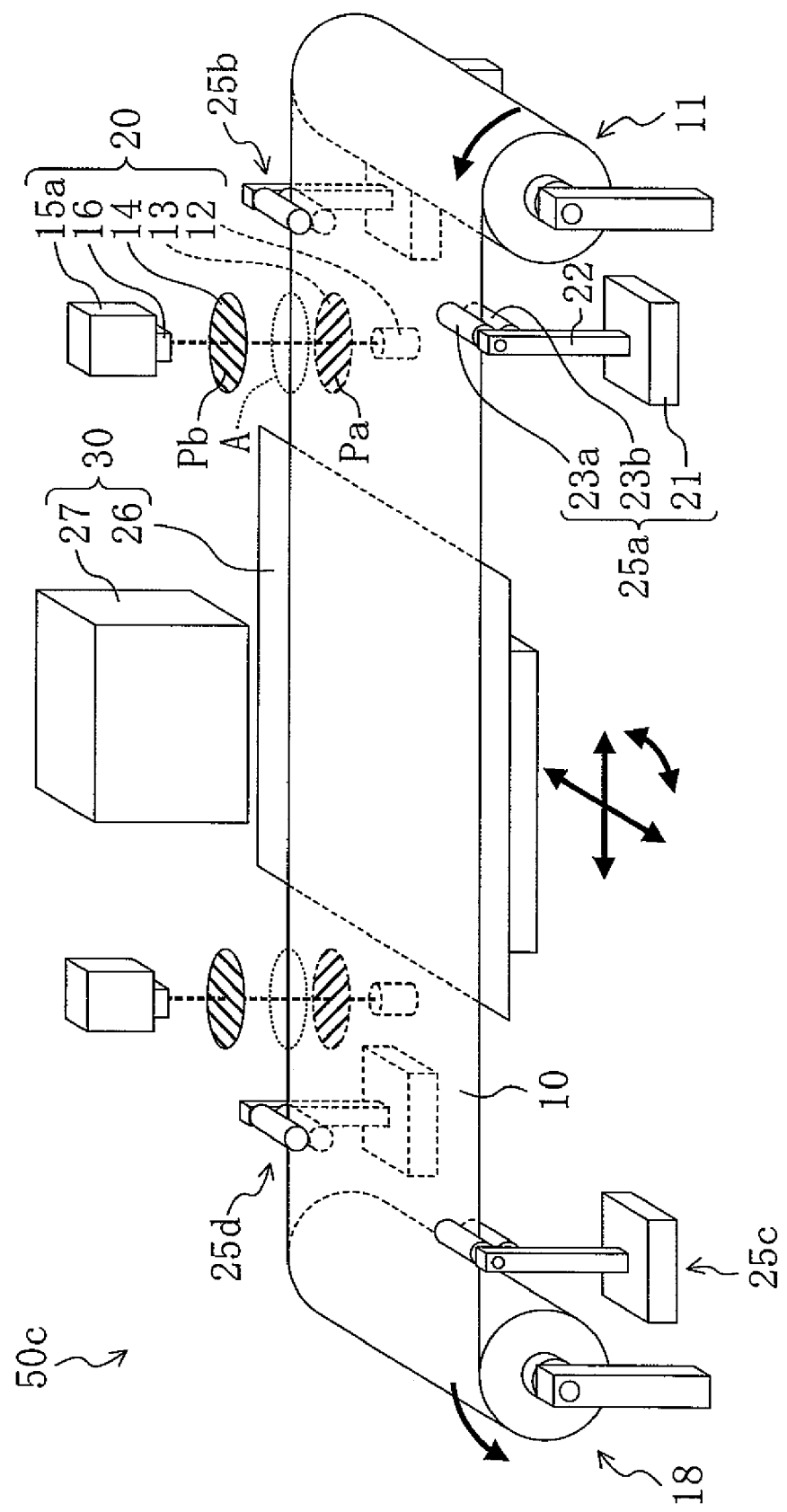
FIG. 13 is a perspective view of a processing apparatus 50c according to a third preferred embodiment of the present invention.

FIG. 13 is a perspective view of a processing apparatus 50c of the present preferred embodiment.

The processing apparatus 50c further includes an exposure unit 30 in addition to the components of to the processing apparatus 50a of the first preferred embodiment.

As shown in FIG. 13, the exposure unit 30 includes, for example, a suction stage 26 arranged to hold the film substrate 10 from its rear side by a vacuum chuck, and a light source 27 arranged to expose a photosensitive resin film that is formed on the film substrate 10 held on the suction stage 26.

The suction stage 26 is arranged so as to be movable in the longitudinal and lateral directions along the transfer direction of the film substrate 10, and rotatable in a horizontal plane.

A photomask (not shown) for exposing the photosensitive resin film on the film substrate 10 in a predetermined pattern is provided between the film substrate 10 held on the suction stage 26 and the light source 27.

A method for exposing the photosensitive resin film formed on the film substrate 10 by using the processing apparatus 50c of the above structure will be described below.

First, the positional relation between the film substrate 10 and the suction stage 26 is verified by detecting an edge of the film substrate 10 by the edge detection apparatuses 20.

Then, the suction stage 26 is moved and rotated as appropriate to hold the film substrate 10 on the suction stage 26 so that the lateral sides of the film substrate 10 and the lateral sides of the suction stage 26 become parallel or substantially parallel to each other.

Then, the suction stage 26 holding the film substrate 10 thereon is moved and rotated as appropriate to place the film substrate 10 at a predetermined position under the light source 27.

Moreover, light from the light source 27 is supplied to the film substrate 10 through the photomask to expose the photosensitive resin film on the film substrate 10 placed at the predetermined position.

Finally, after being released from the suction stage 26, the film substrate 10 is step-transferred by one processing unit by the wind-off roll 11 and the wind-up roll 18.

The photosensitive resin film formed on the film substrate 10 can be exposed in this manner.

According to the processing apparatus 50c of the present preferred embodiment, since the position of the film substrate 10 in the apparatus is accurately detected by the CCD cameras 15a, and meandering of the film substrate 10 is corrected by the meandering correction units 25a through 25d, the photosensitive resin film formed on the film substrate 10 can be accurately exposed.

Fourth Preferred Embodiment

Figure 14:
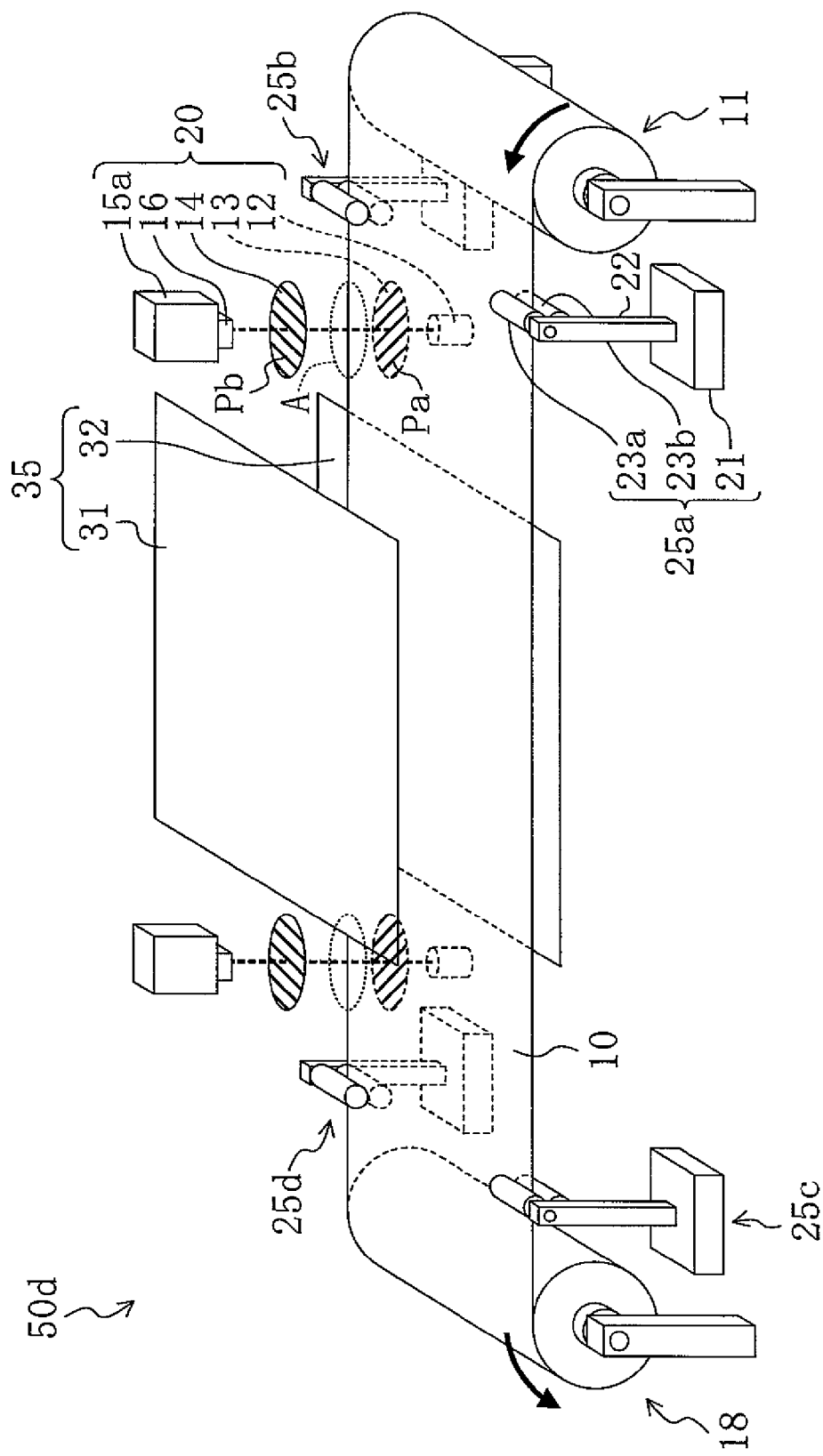
FIG. 14 is a perspective view of a processing apparatus 50d according to a fourth preferred embodiment of the present invention.

FIG. 14 is a perspective view of a processing apparatus 50d of the present preferred embodiment.

The processing apparatus 50d further includes a film formation unit 35 in addition to the components of the processing apparatus 50a of the first preferred embodiment.

As shown in FIG. 14, the film formation unit 35 includes an upper electrode 31 and a lower electrode 32, which are disposed so as to face each other.

A plurality of gas nozzles (not shown) arranged to feed a source gas are provided on the lower surface of the upper electrode 31.

Moreover, the upper electrode 31 is configured to be connected to a high-frequency power source (not shown) to receive high frequency electric power from the high frequency power source.

The lower electrode 32 is configured so that the film substrate 10, which is step-transferred, is placed on the upper surface thereof.

Moreover, the lower electrode 32 is configured to include a built-in heater inside so that the surface temperature thereof can be controlled, and is electrically grounded.

A method for forming an amorphous silicon film on the film substrate 10 by using the processing apparatus 50d of the above structure will be described below.

First, an edge of the film substrate 10 is detected by the edge detection apparatuses 20 to verify that the film substrate 10 is located at a predetermined position between the upper electrode 31 and the lower electrode 32 of the film formation unit 35. Note that, if the film substrate 10 is not located at the predetermined position, the meandering correction units 25a through 25d, the wind-off roll 11, the wind-up roll 18, and the like are operated as appropriate to place the film substrate 10 at the predetermined position.

Then, the pressure in a processing chamber (not shown) including the film formation unit 35 is reduced while supplying a source gas, such as monosilane, into the processing chamber.

Moreover, high frequency electric power is applied to the upper electrode 31 to generate plasma of the source gas between the upper electrode 31 and the lower electrode 32, and thus, to generate radicals in the plasma. Then, the radicals are deposited on the surface of the film substrate 10 to form an amorphous silicon film on the film substrate 10.

Finally, after application of the high frequency electric power is stopped, and supply of the source gas into the processing chamber is stopped, the film substrate 10 is step-transferred by one processing unit by the wind-off roll 11 and the wind-up roll 18.

The amorphous silicon film can be formed on the film substrate 10 in this manner.

According to the processing apparatus 50d of the present preferred embodiment, since the position of the film substrate 10 in the apparatus is accurately detected by the CCD cameras 15a, an amorphous silicon film can be accurately formed at a predetermined position on the film substrate 10.

Although a CVD (chemical vapor deposition) apparatus is shown as an example of the film formation unit in the present preferred embodiment, the film formation unit may be a sputtering apparatus.

Moreover, although the apparatuses including the meandering correction units, the exposure unit, and the film formation unit are shown as examples of the processing apparatus in the above preferred embodiments, the present invention is applicable also to various manufacturing apparatuses, such as a cleaning apparatus, an etching apparatus, an inspection apparatus, and a panel assembly apparatus, for example.

Moreover, although the method for directing linearly polarized light to the edge(s) of the film substrate 10 from the rear side thereof, and observing the linearly polarized light from the front side thereof is shown as an example in the above preferred embodiments, linearly polarized light may be directed to the edge(s) of the film substrate 10 from the front side thereof, and may be observed from the rear side thereof, according to the present invention.

As described above, various preferred embodiments of the present invention are capable of accurately detecting an edge of a film substrate having optical isotropy, and thus, are useful for roll-to-roll manufacturing of LCD panels.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for detecting an edge of a transparent substrate having optical isotropy, comprising:
   directing linearly polarized light from a light source, converted by a first polarizer, to an edge of a rear surface of the transparent substrate; and
   observing (i) the linearly polarized light that is transmitted through the edge of the transparent substrate, (ii) the linearly polarized light that passes outside the transparent substrate, and (iii) emitted light that is propagated through inside of the transparent substrate and emitted from a side surface of the edge of the transparent substrate, from a front side of the transparent substrate through a second polarizer having a polarization axis that is perpendicular or substantially perpendicular to a polarization axis of the first polarizer, wherein the emitted light has no linear polarization property after being emitted from the side surface of the edge of the transparent substrate.

2. An apparatus for detecting an edge of a transparent substrate having optical isotropy, comprising:
   a light source provided on a rear side of the edge of the transparent substrate;
   a first polarizer provided between the transparent substrate and the light source, and arranged to convert light from the light source to linearly polarized light;
   a light receiving unit provided on a front side of the edge of the transparent substrate; and
   a second polarizer provided between the transparent substrate and the light receiving unit, and having a polarization axis that is perpendicular or substantially perpendicular to a polarization axis of the first polarizer; wherein
   the light receiving unit is configured to observe, through the second polarizer, (i) the linearly polarized light that is converted by the first polarizer and is transmitted through the edge of the transparent substrate, (ii) the linearly polarized light that is converted by the first polarizer and passes outside the transparent substrate, and (iii) emitted light that is converted by the first polarizer, and is propagated through inside of the transparent substrate and emitted from a side surface of the edge of the transparent substrate, the emitted light having no linear polarization property after being emitted from the side surface of the edge of the transparent substrate.

3. The apparatus of claim 2, further comprising a microscope provided between the light receiving unit and the second polarizer, and arranged to magnify and observe the edge of the transparent substrate.

4. The apparatus of claim 2, wherein the light receiving unit includes at least one-dimensional light receiving element, or a camera arranged to detect a two-dimensional image.

5. A processing apparatus for transferring and processing a transparent substrate having optical isotropy by a roll-to-roll method, comprising:

a light source provided on a rear side of an edge of the transparent substrate;
a first polarizer provided between the transparent substrate and the light source, and arranged to convert light from the light source to linearly polarized light;
a light receiving unit provided on a front side of the edge of the transparent substrate; and
a second polarizer provided between the transparent substrate and the light receiving unit, and having a polarization axis that is perpendicular or substantially perpendicular to a polarization axis of the first polarizer; wherein
the light receiving unit is configured to detect the edge of the transparent substrate being transferred, by observing, through the second polarizer, (i) the linearly polarized light that is converted by the first polarizer and is transmitted through the edge of the transparent substrate, (ii) the linearly polarized light that is converted by the first polarizer and passes outside the transparent substrate, and (iii) emitted light that is converted by the first polarizer and is propagated through inside of the transparent substrate and emitted from a side surface of the edge of the transparent substrate, the emitted light having no linear polarization property after being emitted from the side surface of the edge of the transparent substrate.

6. The processing apparatus of claim 5, further comprising an exposure unit arranged to perform an exposure process on the transparent substrate whose edge has been detected by the light receiving unit.

7. The processing apparatus of claim 5, further comprising a film formation unit arranged to form a film on the transparent substrate whose edge has been detected by the light receiving unit.

8. The processing apparatus of claim 5, further comprising a meandering correction unit arranged to correct meandering of the transparent substrate whose edge has been detected by the light receiving unit.

* * * * *